April 21, 1942.    S. H. CALDWELL    2,280,186
SIGNAL
Filed June 19, 1939
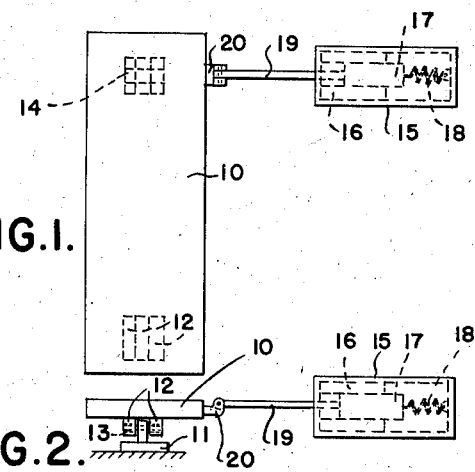
FIG. 1.
FIG. 2.
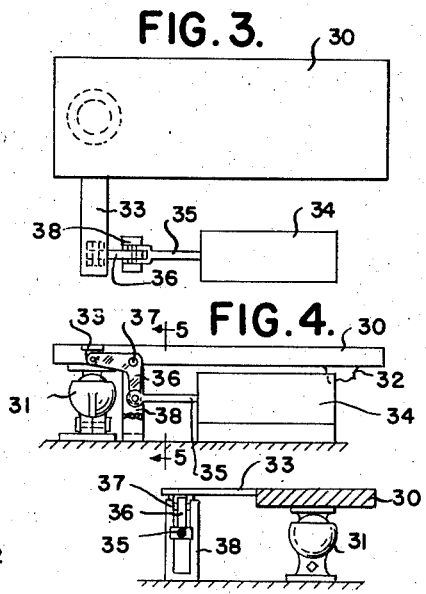
FIG. 3.
FIG. 4.
FIG. 5.
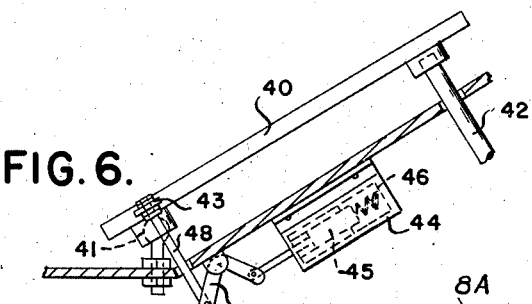
FIG. 6.
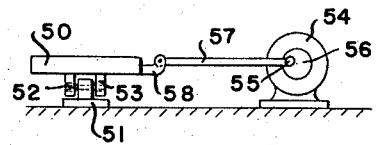
FIG. 7.
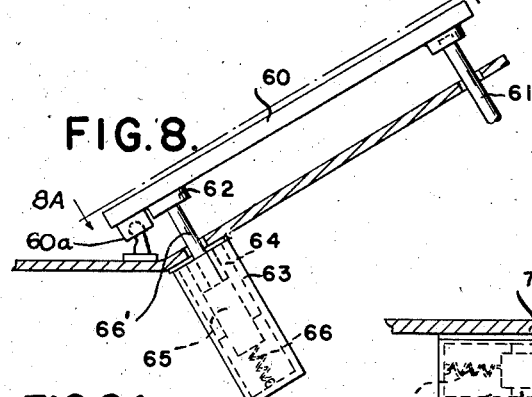
FIG. 8.
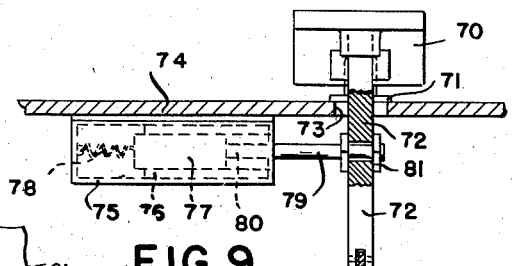
FIG. 9.
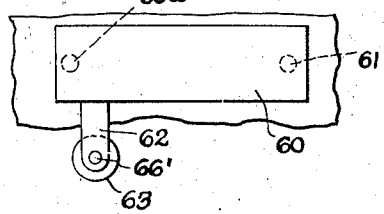
FIG. 8A.
INVENTOR.
STUART H. CALDWELL
BY
ATTORNEYS Patented Apr. 21, 1942

2,280,186

UNITED STATES PATENT OFFICE 2,280,186

SIGNAL

Stuart H. Caldwell, Detroit, Mich., assignor to Kelch Heater Company, Detroit, Mich., a corporation of Michigan Application June 19, 1939, Serial No. 279,958

7 Claims. (Cl. 177—324)

The present invention relates to a signal, and more particularly to a control device such as a lever or foot pedal associated with means to impose a wabble motion thereon without interfering with normal control by the control member.

For purposes of illustration I have chosen to show a foot pedal of the type conventionally employed in automotive vehicles as an accelerator pedal. It will be readily understood the invention is capable of much broader use and may be associated with any control member adapted to be engaged by an operator.

In developing a signal of this type a number of important considerations were kept in mind. In the first place it was desired to develop a signal which would make itself felt as a tactual signal and which would be both inaudible and invisible. In the second place, it was desired to develop a signal which would apprise the operator without in any way interfering with normal control by the operator through the medium of the control member. It was further desired to develop a signal which would make itself known to the operator in what may be termed a gradual sense rather than startling the operator or distracting his attention from his duties. It was further desired to develop a signal which would be economical to produce and economical in operation, and yet which would be sturdy and dependable.

The foregoing comprises the principal objects of the invention which have been accomplished by means of an arrangement of parts illustrated in the accompanying drawing, in which Figure 1 is a more or less diagrammatic plan view of one embodiment of my invention;

Figure 2 is an end view of the device shown in Figure 1;

Figure 3 is a plan view of a different embodiment of my invention;

Figure 4 is a side elevation of the embodiment illustrated in Figure 3;

Figure 5 is a section on the line 5—5, Figure 4;

Figure 6 is a side elevation partly in section illustrating yet another embodiment of my invention;

Figure 7 is an end view illustrating yet another embodiment of my invention;

Figure 8 is a side elevation partly in section illustrating another embodiment of my invention;

Figure 8A is a view in the direction of arrows 8A, Figure 8; and

Figure 9 is an end view partly in section illustrating yet another embodiment of my invention.

I have illustrated a number of different embodiments of my invention, but these are to be regarded as merely illustrative and suggestive of an arrangement of parts adapted to carry out the broad principles of my invention.

Referring first to Figures 1 and 2, I have shown an accelerator pedal 10 which is pivoted to a bracket 11 by means of a pair of depending lugs 12 or the like. The pivot connection formed by the bracket 11 and the lugs 12 is a loose connection and is adapted to permit a wabble motion of the pedal 10 in addition to its normal control motion about the axis of a pin 13 interconnecting the bracket 11 and the lugs 12. As a practical matter, it is necessary only to provide the necessary looseness in this connection, although if desired substantially universal movement of the pedal 10 may be provided by means of a universal joint or the like illustrated in some of the other modifications. As is well understood, the pedal 10 is adapted to be connected to a rod or link (not shown in this figure), by means of a connection indicated generally at 14 in Figure 1. The connection 14 transmits motion to the rod or link referred to which in turn controls the opening and closing movement of a conventional throttle valve, or the like.

As is readily understood, motion of the pedal 10 about the axis of the pin 13 constitutes the control motion, or in other words a motion which controls the position of the throttle valve. Motion of the pedal 10 in any other direction which does not have a component parallel to the so-called control motion is ineffective to exert a control influence on the throttle valve.

I have taken advantage of this fact to devise a signal which will apprise the operator of some condition, or the like, without in any way interfering with normal control of the throttle through the pedal 10. As illustrated in Figures 1 and 2, the signal attachment comprises a solenoid 15 having windings indicated at 16, and a movable plunger or core 17. I have shown a spring 18 for moving the plunger in one direction, and its motion in the opposite direction will be caused upon energization of the windings 16. The plunger 17 is connected to the free end of the pedal 10 by means of a link 19. By the free end of the pedal I refer to the end opposite to its pivotal connection to the bracket 11. The link 19 may be connected to the pedal 10 by means of a bracket 20 in a manner to provide pivotal movement therebetween, or, if desired, the relative pivotal movement may be the result of looseness in the connection between the rod 19 and the bracket 20. As a practical matter, I have found it unnecessary to provide relatively expensive pivot connections inasmuch as the motion of the parts is quite limited. By avoiding the provision of relatively expensive pivot connections, I substantially reduce initial cost of installation and further contribute to its efficiency in operation inasmuch as the number of parts subject to failure is thereby reduced.

The solenoid 15 is connected to a suitable source of current which may be the conventional storage battery provided in motor vehicles. Suitable means which form no part of the present invention may alternately make and break a circuit from the battery to the solenoid 15 upon attainment of a predetermined condition, or the like. Such means are shown by way of example in my prior Patent No. 2,185,329.

As will be evident, intermittent energization of the windings 16 produce a wabble motion of the pedal 10 about an axis which is substantially perpendicular to the plane of the pedal 10 and which passes through the pivot connection formed by the bracket 11 and the lugs 12.

This results in an arcuate motion of the end of the pedal 10 remote from the pivot connection referred to. Inasmuch as the connection between the pedal 10 and the link connecting it to the throttle is also a loose connection, this back and forth wabble motion of the free end of the pedal 10 exerts no control influence on the throttle. At the same time this wabble motion of the pedal 10 at once apprises the operator of the vehicle that a predetermined condition has been attained.

Referring next to Figures 3 to 5, I have illustrated a somewhat different embodiment of my invention. In this instance the pedal 30 is illustrated as connected by means of a ball and socket joint 31 for substantially universal movement. Since the pedal is connected to a link for controlling the opening and closing motion of the throttle by means of a connection indicated at 32, universal movement of the throttle is substantially limited and for practical purposes is restrained to motion about an axis passing through the center of the universal joint 31 and transverse to the long axis of the pedal 30. Motion of the pedal 30 is further restricted to this plane by connection to the solenoid, which will subsequently be described.

Projecting laterally from the pedal 30 substantially adjacent the ball and socket connection 31 is an arm 33. In Figure 4 I have illustrated this arm as somewhat above the ball and socket joint in order to avoid confusion in the drawing. It will be appreciated, however, that the arm 33 may, and preferably does, extend substantially in the horizontal plane of the ball and socket joint 31.

In order to transmit a signal to the pedal 30, I provide a solenoid 34, which conveniently may be mounted on the floor board of the vehicle. The solenoid 34 is provided with suitable windings, and a plunger (not shown), the plunger being connected by a link 35 to a bell crank 36 pivoted as indicated at 37 to a bracket 38 mounted on the floor board of the vehicle. One arm of the bell crank 36 is connected to the arm 33. As is most clearly shown in Figure 4, reciprocation of the link 35 along the axis of the solenoid 34 results in a substantially vertical oscillation of the arm 33. This in turn results in a corresponding oscillation of the pedal 30 about a longitudinal axis passing through the ball and socket joint 31. The amount of this motion is quite small, and as will be evident does not in any way interfere with normal control by the operator.

Referring next to Figure 6, I have illustrated a somewhat different arrangement of parts for accomplishing the type of wabble motion illustrated in Figures 3 to 5. In this instance the pedal 40 is pivotally mounted on the floor board by means of a ball and socket joint, indicated at 41. In this figure I have illustrated at 42 a rod interconnecting the free end of the pedal 40 with the throttle of the vehicle. The pedal 40 is provided with a laterally extending arm 43, similar to the arm 33, best shown in Figure 3. In this instance a solenoid 44, provided with a plunger 45 and a return spring 46, is mounted beneath the floor board and is interconnected to the free end of the arm 43 through the medium of a bell crank 47 and a loosely mounted link 48. Again, if desired, the link 48 may be provided with a pivotal connection with the end of the arm 43, but for reasons of economy I prefer to provide for relative movement between these parts by the simple expedient of providing a loose connection. A loose connection which is entirely suitable for this purpose, may result from the provision of soft rubber bushings interposed between the arm 43 and the link 48.

The operation of this embodiment of my invention is identical with the operation of the embodiment illustrated in Figures 3 to 5, and differs therefrom principally in that the solenoid is concealed beneath the floor board.

Referring now to Figure 7, I illustrate an embodiment of my invention which is characterized principally by the provision of a different type of motor. In this figure the pedal 50 is pivoted to a bracket 51 by means of a pin 52 carried by a pair of depending lugs 53. This pivot connection, as in the case previously referred to, is a loose connection which permits a wabble motion of the pedal 50 in addition to the usual control motion. A motor indicated generally at 54 is provided with an eccentric pin 55 carried by a rotor 56. The eccentric pin is connected by means of a link 57 to a bracket 58 carried by the pedal 50. The motor 54 may be of any suitable type. It may, for example, be a small electric motor, or it may be a fluid pressure motor operable either from a manifold suction or from a suitable source of pressure available in the normal operation of the motor vehicle.

While I have illustrated this type of motor as carried above the floor board and connected to the pedal 50 in the same manner as the solenoid 15, it will be appreciated that a motor of this type may, if desired, be substituted for the solenoids 15, 34 and 44 in the embodiments previously described or for the solenoids described in Figures 8 and 9. It will likewise be appreciated that the motor 54 may be disposed beneath the floor board if desired and connected to impart a wabble motion to the pedal by means of suitable linkage and connecting means extending through the floor board of the vehicle.

I have illustrated a somewhat different embodiment of my invention in Figures 8 and 8A, in which the pedal 60 is pivoted adjacent its lower lefthand end by an appropriate connection, which may take the form of a universal joint or a loose connection between interconnected parts as indicated at 60a. The pedal 60 is connected by means of a rod 61 to the throttle, and its control motion will accordingly be a pivotal motion about a horizontal axis passing through pivot connection 60a. In order to impart a wabble motion to the pedal 60 in the form of an oscillation about an axis extending parallel to the long direction of the pedal 60, I provide a laterally extending arm 62 corresponding in all respects to the arm 33 shown in Figure 3. Beneath the floor board of the vehicle I provide a solenoid 63 having a winding 64 and a movable plunger 65. If desired, a return spring 66 may be provided also. The plunger 65 is connected to the free end of the arm 62 by means of a link or rod 66'. A suitable loose connection or pivot connection between the rod 66' and the free end of the arm 62 will be provided as in the modifications previously discussed.

By positioning the solenoid as shown in Figure 8, the necessity of providing linkage for transforming the reciprocating motion of the plunger of the solenoid into a reciprocating or oscillating motion in a different direction is obviated.

Referring now specifically to Figure 9, I have illustrated a somewhat different arrangement of parts for accomplishing my purpose. In this case a pedal 70 is pivoted adjacent the lower rear end to a bracket 71 which may provide a ball and socket connection or which may permit the wabble motion desired by reason of the looseness of the connection. Loosely connected to the upper free end of the bracket 70 is a rod or link 72 passing through an aperture 73 in the floor board 74 and adapted to interconnect the pedal with the throttle control. In this instance I prefer to provide a solenoid 75 which may be mounted beneath the floor board 74. The solenoid comprises a winding 76, a plunger 77, and a return spring 78 for the plunger. In order to impart a wabble motion to the pedal 70 through the medium of reciprocatory motion of the plunger 77, I interconnect the plunger with the link 72 by means of a rod 79. Rod 79 may conveniently be pivoted as indicated at 80 to the plunger 77, and the connection generally indicated at 81 between the rod 79 and the link 72 may be a loose connection. If desired, although it is not regarded as necessary, a second pivot connection may be provided between the rod 79 and its connection to the link 72.

As will be readily apparent, intermittent energization of the solenoid 75 will transmit a transverse wabble motion to the free end of the pedal 70. This wabble motion will immediately attract the attention of the operator whose foot is on the accelerator pedal, without in any way affecting his control over the motor.

The foregoing specific embodiments of my invention will serve to suggest many of the possible applications thereof. It will be readily apparent that instead of being applied to a lever adapted to operate as a foot pedal, it may with equal effectiveness be applied directly to a manually gripped member, or a pedal which is mounted for pure reciprocation rather than for a pivotal movement about its support. An important consideration which must be borne in mind in carrying out my invention is that the wabble motion must have no component parallel to what I have termed the control motion of the control member. Thus for example a manually gripped lever which is adapted to be moved forward and backward to control some device may have imparted thereto a lateral wabble for attracting the attention of the operator.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A control lever mounted for control movement about a first axis and for signalling movement about a second axis perpendicular to said first axis, and motor means for imparting signalling motion to said lever by pivoting said lever about said second axis.

2. A control lever mounted for control movement about a first axis, and for signalling movement about a second axis perpendicular to said first axis and parallel to said lever, and motor means for imparting a signalling motion to said lever by pivoting said second lever about said second axis.

3. A control lever mounted for control movement about a first axis, and for signalling movement about a second axis perpendicular to said first axis and perpendicular also to said lever, and motor means for imparting a signalling motion to said lever by pivoting said second lever about said second axis.

4. A control lever pivoted for substantially universal movement, said lever being movable in one direction to exert a control effect, normally inoperative motor means, connections between said motor means and said lever arranged to permit motion of said lever in a direction to exert a control effect while preventing other movement thereof, said motor means, when energized, being effective through said connection to impart a bodily signal motion to said lever in a direction transverse to said control movement thereof.

5. In a motor vehicle, an accelerator pedal pivoted at one end above the floor and having a link connecting the free end of said pedal and the throttle of the motor, a motor connected to said pedal at its pivoted end laterally of the pivot, and adapted when energized to impose an oscillatory motion about the longitudinal axis of said pedal.

6. A control member mounted for control movement in a first direction and for bodily signalling movement in a direction transverse to said control movement, and motor means connected to said member for moving said member bodily in said signalling direction to impart a tactual signal to the operator.

7. A control member mounted for control movement in a first direction and for bodily signalling movement in a direction transverse to said control movement, and motor means connected to said member for oscillating said member bodily in said signalling direction to impart a tactual signal to the operator.

STUART H. CALDWELL.